US012567789B2

(12) United States Patent
Toliyat et al.

(10) Patent No.: US 12,567,789 B2
(45) Date of Patent: Mar. 3, 2026

(54) DUAL-ROTOR AXIAL FLUX MAGNETIC GEAR AND RELATED APPARATUS AND SYSTEMS

(71) Applicants: The Texas A&M University System, College Station, TX (US); U.S. Army Research Laboratory, Adelphi, MD (US)

(72) Inventors: Hamid A. Toliyat, College Station, TX (US); Bryton Praslicka, College Station, TX (US); Shrikesh Sheshaprasad, College Station, TX (US); Farid Saemi, College Station, TX (US); Matthew C. Gardner, Dallas, TX (US); Matthew C. Johnson, College Station, TX (US)

(73) Assignees: The Texas A&M University System, College Station, TX (US); U.S. Army Research Laboratory, Adelphi, MD (US)

( * ) Notice: Subject to any disclaimer, the term of this patent is extended or adjusted under 35 U.S.C. 154(b) by 290 days.

(21) Appl. No.: 18/130,775

(22) Filed: Apr. 4, 2023

(65) Prior Publication Data
US 2023/0327533 A1     Oct. 12, 2023

Related U.S. Application Data

(60) Provisional application No. 63/327,795, filed on Apr. 6, 2022.

(51) Int. Cl.
*H02K 49/10*          (2006.01)

(52) U.S. Cl.
CPC ................................. *H02K 49/102* (2013.01)

(58) Field of Classification Search
CPC ...... H02K 49/00; H02K 49/10; H02K 49/102; H02K 49/106; H02K 49/108; H02K 16/00; H02K 16/02; H02K 16/025; H02K 1/27; H02K 1/276; H02K 1/2791; H02K 11/215
See application file for complete search history.

(56) References Cited

U.S. PATENT DOCUMENTS

| | | | | |
|---|---|---|---|---|
| 4,820,949 A | * | 4/1989 | Mizobuchi | ........... H02K 5/1677 310/90 |
| 2012/0212085 A1 | * | 8/2012 | Fu | ......................... H02K 21/24 310/58 |

FOREIGN PATENT DOCUMENTS

| | | | | |
|---|---|---|---|---|
| GB | 2457682 A | * | 8/2009 | |
| JP | 2016142407 A | * | 8/2016 | |

* cited by examiner

*Primary Examiner* — Tran N Nguyen
(74) *Attorney, Agent, or Firm* — Jackson Walker LLP

(57)          ABSTRACT

In some aspects, a magnetic gear system includes a flux focusing magnet arrangement having a low-pole count rotor, a pair of modulator rotors disposed on either side of the low-pole count rotor, and a pair of high-pole count outer rotors disposed outside of the pair of modulator rotors. In some aspects, a magnetic gear system includes a motor with a stator and a pair of low-pole count rotors disposed on either side of the stator. The magnetic gear system further includes a pair of modulator rotors disposed on either side of the motor, and a pair of high-pole outer rotors disposed on opposite sides of the pair of modulator rotors.

12 Claims, 5 Drawing Sheets

DUAL-ROTOR AXIAL FLUX MAGNETIC GEAR AND RELATED APPARATUS AND SYSTEMS

CROSS-REFERENCE TO RELATED APPLICATIONS

This patent application claims priority from, and incorporates by reference the entire disclosure of, U.S. Provisional Patent Application No. 63/327,795 filed on Apr. 6, 2022.

TECHNICAL FIELD

The present disclosure relates generally to magnetic systems, but not by way of limitation, to dual-rotor axial flux magnetic gear systems.

BACKGROUND

The section provides background information to facilitate a better understanding of the various aspects of the disclosure. It should be understood that the statements in this section of this document are to be read in this light, and not as admissions of prior art.

Magnetic gears perform the same task as their mechanical counterparts; however, they do so through the modulated interaction between the flux generated by magnets instead of through mechanical interaction between gear teeth. Mechanical gearing systems have been developed for a wide variety of applications. The present disclosure presents magnetic gearing systems that may be also be implemented in a variety of applications.

SUMMARY OF THE INVENTION

This summary is provided to introduce a selection of concepts that are further described below in the Detailed Description. This summary is not intended to identify key or essential features of the claimed subject matter, nor is it to be used as an aid in limiting the scope of the claimed subject matter.

In some aspects, a magnetic gear system includes a flux focusing magnet arrangement having a low-pole count rotor, a pair of modulator rotors disposed on either side of the low-pole count rotor, and a pair of high-pole count outer rotors disposed outside of the pair of modulator rotors.

In some aspects, a magnetic gear system includes a motor with a stator and a pair of low-pole count rotors disposed on either side of the stator. The magnetic gear system further includes a pair of modulator rotors disposed on either side of the motor, and a pair of high-pole outer rotors disposed on opposite sides of the pair of modulator rotors.

In some aspects, a magnetic gear system includes a motor, a pair of modulator rotors disposed on either side of the motor, and a pair of high-pole outer rotors disposed on opposite sides of the pair of modulator rotors.

BRIEF DESCRIPTION OF THE DRAWINGS

A more complete understanding of the subject matter of the present disclosure may be obtained by reference to the following Detailed Description when taken in conjunction with the accompanying Drawings wherein.

DETAILED DESCRIPTION

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described. Reference will now be made to more specific embodiments of the present disclosure and data that provides support for such embodiments. However, it should be noted that the disclosure below is for illustrative purposes only and is not intended to limit the scope of the claimed subject matter in any way.

Figure 1:
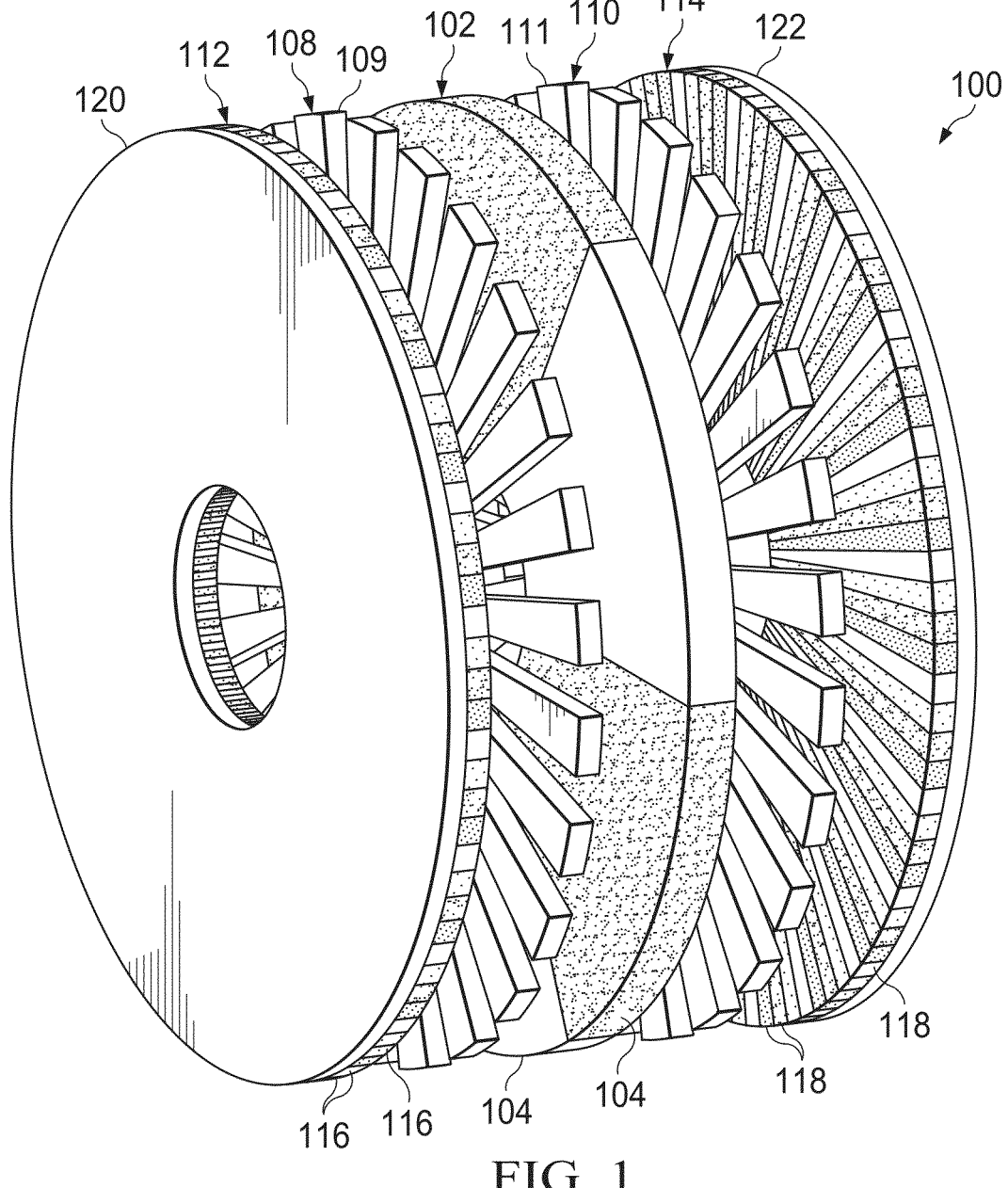
FIG. 1 illustrates a dual-rotor axial flux magnetic gear system, according to aspects of the disclosure.

FIG. 1 illustrates a dual-rotor axial flux magnetic gear system 100, according to aspects of the disclosure. System 100 uses a low-pole count, high-speed, central rotor 102 that includes magnets 104 and is generally free to rotate. "Low-pole count" is used herein to describe a rotor having fewer poles than outer rotors 112, 114 (e.g., about 2 to 20 poles). "High-speed" is used herein as a relative term that indicates that rotor 102 rotates at a higher speed than outer rotors 112, 114 and/or modulator rotors 116, 118. In a variation of system 100 of FIG. 1, central rotor 102 may have more poles than outer rotors 112, 114 (e.g., having more poles may be referred to as a high-pole count rotor). In some aspects, central rotor 102 is connected to an external shaft, for example a shaft that passes through the middle of component of system 100. In some aspects the external shaft is an input shaft that is driven by a motor. Magnets 104 of central rotor 102 are magnetized up and down (i.e., to the left and right as oriented in FIG. 1), parallel to the axis of rotation. In some aspects, magnets 104 may be magnetized tangentially and have ferromagnetic bodies positioned between adjacent magnets 104 (similar to rotors 206, 208 of FIG. 2A). Placing ferromagnetic bodies between magnets 104 beneficially creates a flux focusing topology.

A pair of modulator rotors 108, 110 are positioned on either side of central rotor 102. Modular rotors 108, 110 may be made of, for example, a ferromagnetic material and each is comprised of a plurality of radially extending members 109, 111, respectively. A pair of outer rotors 112, 114 is positioned on either side of modulator rotors 108, 110. Outer rotors 112, 114 include a plurality of poles. In some aspects, outer rotors 112, 114 are high-pole count rotors comprising a plurality of magnets 116, 118, respectively. "High-pole count" is used herein to describe a rotor having more poles than central rotor 102. In some aspects, outer rotors 112, 114 may have fewer poles than central rotor 102. In some aspects, magnets 116, 118 are arranged in a Halbach configuration. Back irons 120, 122 may be positioned on back sides of outer rotors 112, 114. As illustrated in FIG. 1, there are air gaps between each of the rotors. The size of the air gaps depends on the application, but may be between about 0.5 mm to about 2 mm.

Low-speed shafts may be connected to outer rotors 112, 114 or modulator rotors 108, 110. "Low-speed" is used herein to denote relative speed compared to the external shaft connected rotor 104. In some aspects "low-speed" is a ratio less than 12:1 (e.g., "high-speed" is 15 times faster than outputs), with gear ratios in the 3:1 to 8:1 range. In some aspects, a "low-speed" shaft is an output shaft. In some aspects, two separate low-speed shafts are used. In some aspects, a single low-speed shaft that is connected to either outer rotors 112, 114 or modulator rotors 108, 110 is used. The low-speed shafts may be arranged coaxially with the external shaft that is coupled to central rotor 102. In some aspects, modulator rotors 108, 110 are fixed and outer rotors 112, 114 are free to rotate. In some aspects, modulator rotors 108, 110 are free to rotate and outer rotors 112, 114 are fixed. In either aspect, the low-speed shafts are connected to the rotating components. The external shaft connected to central rotor 102 may be an input shaft that rotate central rotor 102. Rotation of central rotor 102 imparts rotation to the rotating components, but at a different speed than the speed of central rotor 102. The speed of the rotating components is reduced relative to the speed of central rotor 102 due to the presence of the high-pole count of outer rotors 112, 114 and modulator rotors 108, 110. The speed reduction may be tuned by altering the number of magnetic poles of outer rotors 112, 114 and/or the number of soft magnetic pole pieces of modulator rotors 108, 110. In some aspects, outer rotors 112, 114 may be symmetric (i.e., rotors 112, 114 have the same number of poles) so that the low-speed shafts connected thereto rotate at equal speeds. In some aspects, outer rotors 112, 114 are not symmetric (i.e., rotors 112, 114 have a different number of poles) and the low-speed shafts turn at different speeds. Modulator rotors 108, 110 may similarly be symmetric (i.e., same number of members 109, 111) or not symmetric (i.e., different number of members 109, 111) to tune the speeds of the low-speed shafts.

In a variation of system 100 of FIG. 1, all five rotors are free to rotate. Allowing all five rotors to rotate achieves a differential type operation, wherein the gear ratios of each of the two output rotors may change. This aspect may be paired with a continuously variable transmission. In one aspect, system 100 may be connected to a generator. Mechanical power is input into the two outer rotors 112, 114 and electrical power is taken out from stator windings coupled with rotor 102.

Figure 2A:
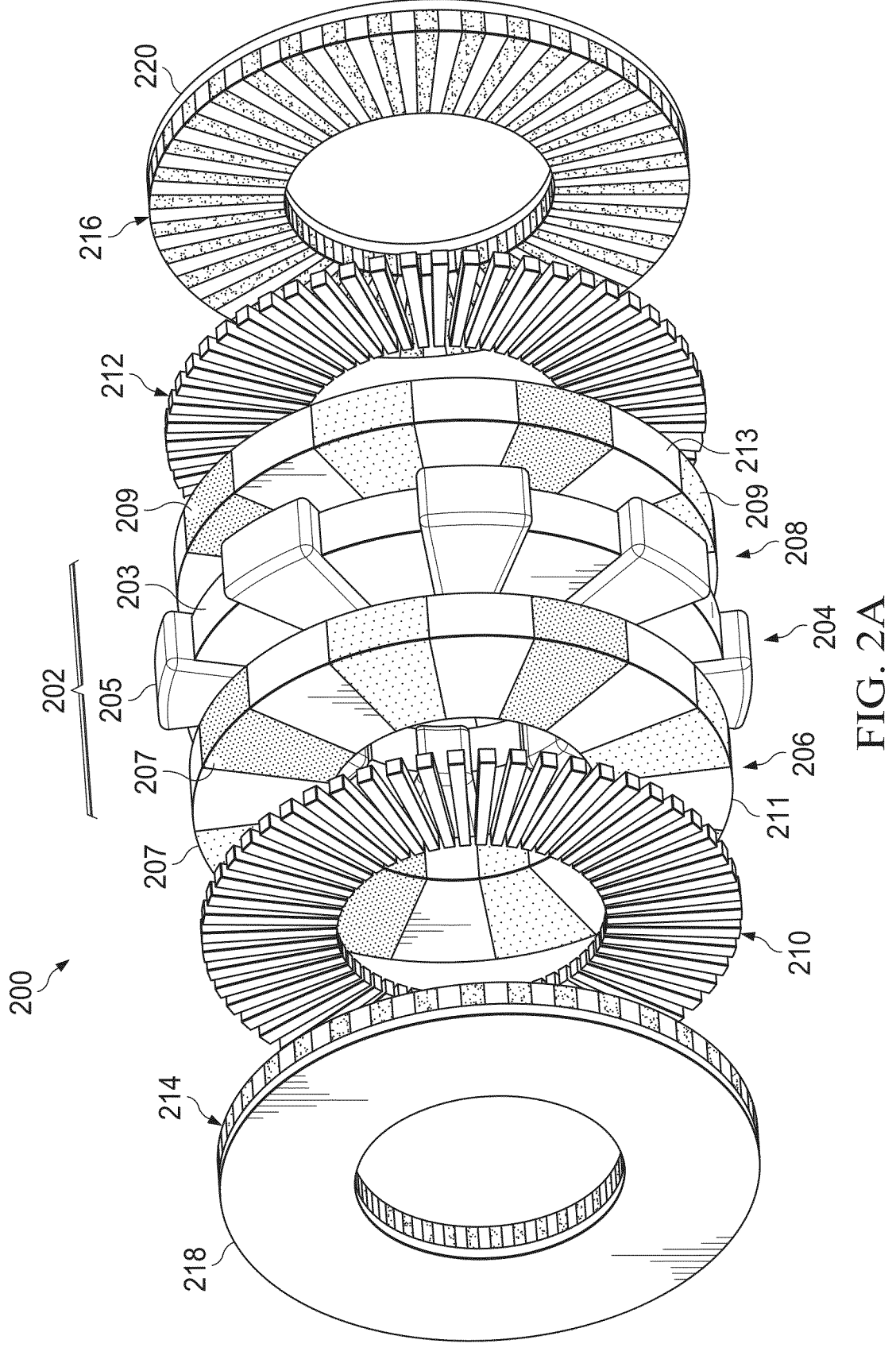
FIG. 2A illustrates a dual-rotor axial flux magnetic gear with integrated axial flux electric machine system, according to aspects of the disclosure.

FIG. 2A illustrates a dual-rotor axial flux magnetic gear system 200, according to aspects of the disclosure. System 200 includes an axial flux motor 202 that comprises a stator 204 and rotors 206, 208. Windings of axial flux motor 202 and stator 204 can take various forms. As shown in FIG. 2, motor 202 is configured with a flux focusing topology. In other aspects, a bobbin-wound configuration could be used. Stator 204 includes windings 205 with ferromagnetic members 203. Rotors 206, 208 include magnets 207, 209, respectively, with the same pole count as stator 204. Rotors 206, 208 are positioned on either side of stator 204, and are free to rotate. Rotors 206, 208 may be configured with conventional or Halbach magnetization patterns. Magnets 207, 209 of rotors 206, 208 may be magnetized tangentially, with ferromagnetic bodies 211, 213 positioned between to focus the magnetic flux axially. Ferromagnetic bodies 211, 213 additionally provide structural support for magnets 207, 209.

System 200 includes a pair of modulator rotors 210, 212, a pair of outer rotors 214, 216, and back irons 218, 220, each of which is similar to the components described above relative to FIG. 1. In various aspects, modulator rotors 210, 212 or outer rotors 214, 216 may be connected to low-speed shafts (e.g., shafts that pass through the central axis of system 200). In other aspects, all six rotors of system 200 may be allowed to freely rotate to achieve various gear ratios.

Figure 2B:
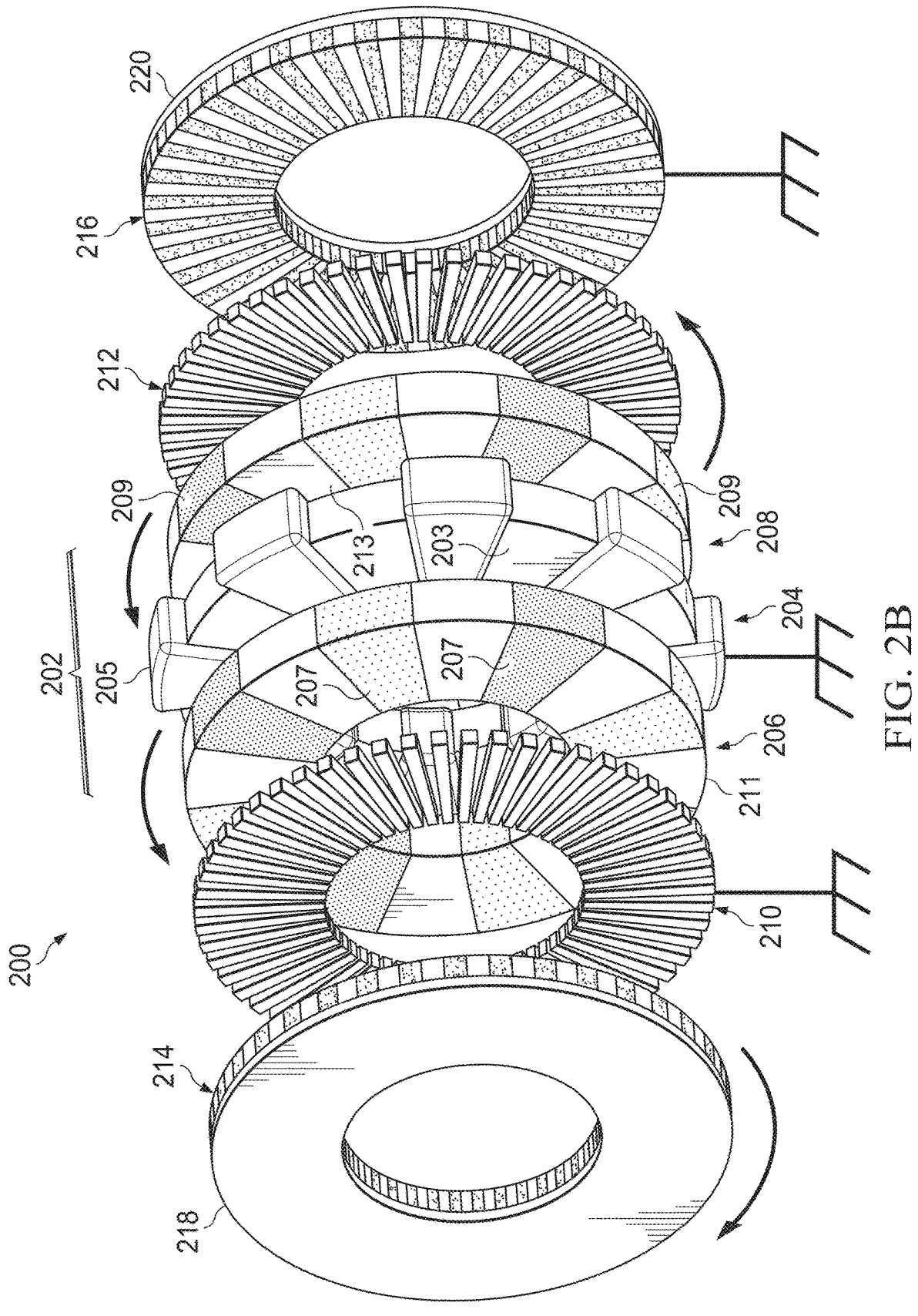
FIG. 2B illustrates an alternative configuration of the dual-rotor axial flux magnetic gear with integrated axial flux electric machine system of FIG. 2A, according to aspects of the disclosure.

FIG. 2B illustrates a configuration of system 200 where modulator rotor 210, stator 204, and outer rotor 216 are held stationary and outer rotor 214 and modulator rotor 212 are free to rotate. In this configuration, operation of motor 202, with rotors 206, 208 rotating in a first direction, results in outer rotor 214 rotating in an opposite direction as rotors 206, 208 and modulator rotor 212 rotating in the same direction as rotors 206, 208. This configuration can be used in a variety of applications, such as counter-rotating propellers for aircraft.

Some embodiments of system 200 do not include rotors 206 and 208, and the axial flux motor 202 may couple directly with the modulator rotors 210 and 212. In this configuration, the operating principle is the similar.

In one aspect of system 200, the pole counts on the high-speed rotors on each side are the same, but the pole counts on the high-pole count rotor of one axial flux magnetic gear (on the other side) are identical to the number of modulators on the other axial flux magnetic gear. For example, in FIG. 2B, the identical flux focusing inner rotors have 8 pole pairs. But the leftmost gear has 46 pole pairs on the high-pole count rotor, and 54 modulator pieces. The rightmost gear has 38 pole pairs on the high-pole count rotor and 46 modulator pieces. In this configuration, if the high-pole count rotor of the leftmost gear is used as the low-speed shaft, the two shafts will be geared from the high-speed shaft by −5.75:1 and +5.75:1, respectively. Thus, two-contra-rotating shafts with the same speed can be achieved. In another aspect, one could have different gear ratios and have contra-rotating shafts, if desired, by again having one low-speed shaft couple the high-pole count rotor, and the other low-speed shaft couple to the modulator rotor.

Figure 3A:
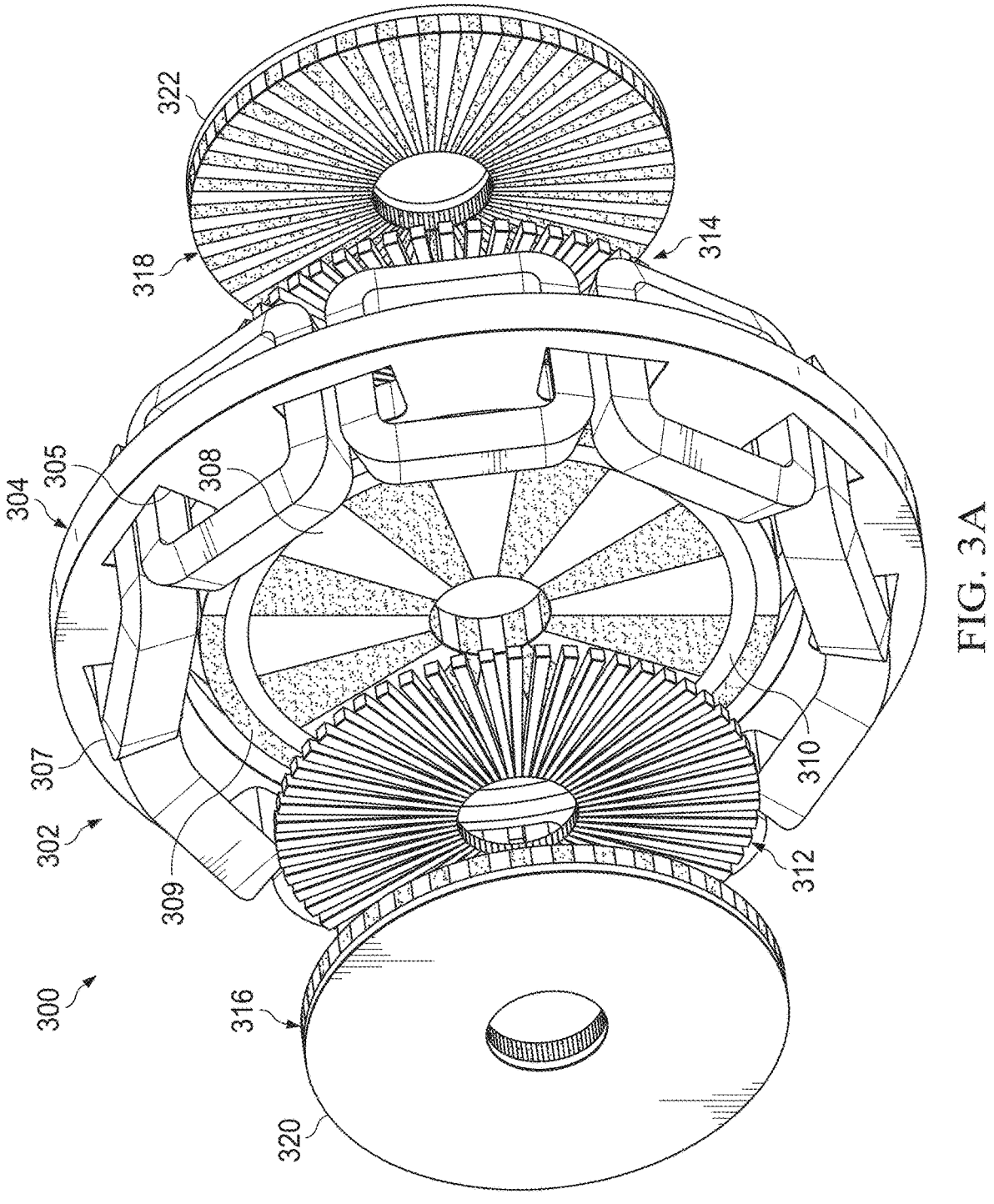
FIG. 3A illustrates a dual-rotor axial flux magnetic gear with integrated radial flux electric machine system, according to aspects of the disclosure.

FIG. 3A illustrates a dual-rotor axial flux magnetic gear system 300 having a motor 302. System 300 is configured to be a more compact design than system 100. The components in FIG. 3A are shown axially spaced apart for the purposes of clarity. Motor 302 includes a radial outer stator 304. Stator 304 has a plurality of openings 305 formed therethrough to accommodate a plurality of winding 307. As illustrated in FIG. 3A, portions of two windings 307 pass through each opening 305. Stator 304 couples magnetically with a plurality of radial magnets 308 of an inner rotor 306. Rotor 306 is also mechanically coupled with axial flux magnets 309 that are secured to a support ring 310. System 300 includes modulator rotors 312 and 314 that are similar to modulators 108, 110, 210, 212 discussed above. System 300 additionally includes outer rotors 316, 318, and back irons 320, 322 that are similar to outer rotors 214, 216 and back irons 218, 220 discussed above.

Electric current can be supplied to windings 307 to impart rotation on rotor 306. Rotation of rotor 306 in turn causes rotation of outer rotors 316 and 318, but at a different speed than the speed of rotor 306. The speed of the rotating components is reduced relative to the speed of rotor 306 due to the high-pole count configuration of outer rotors 316, 318 and modulator rotors 312, 314. The speed reduction may be tuned by altering the number of magnetic poles of outer rotors 316, 318 and/or the number of soft magnetic pole pieces of modulator rotors 312, 314. Similar to the discussions relative to FIGS. 1 and 2A-2B, shafts may be coupled to one or more of outer rotors 316, 318 and modulator rotors 312, 314.

Figure 3B:
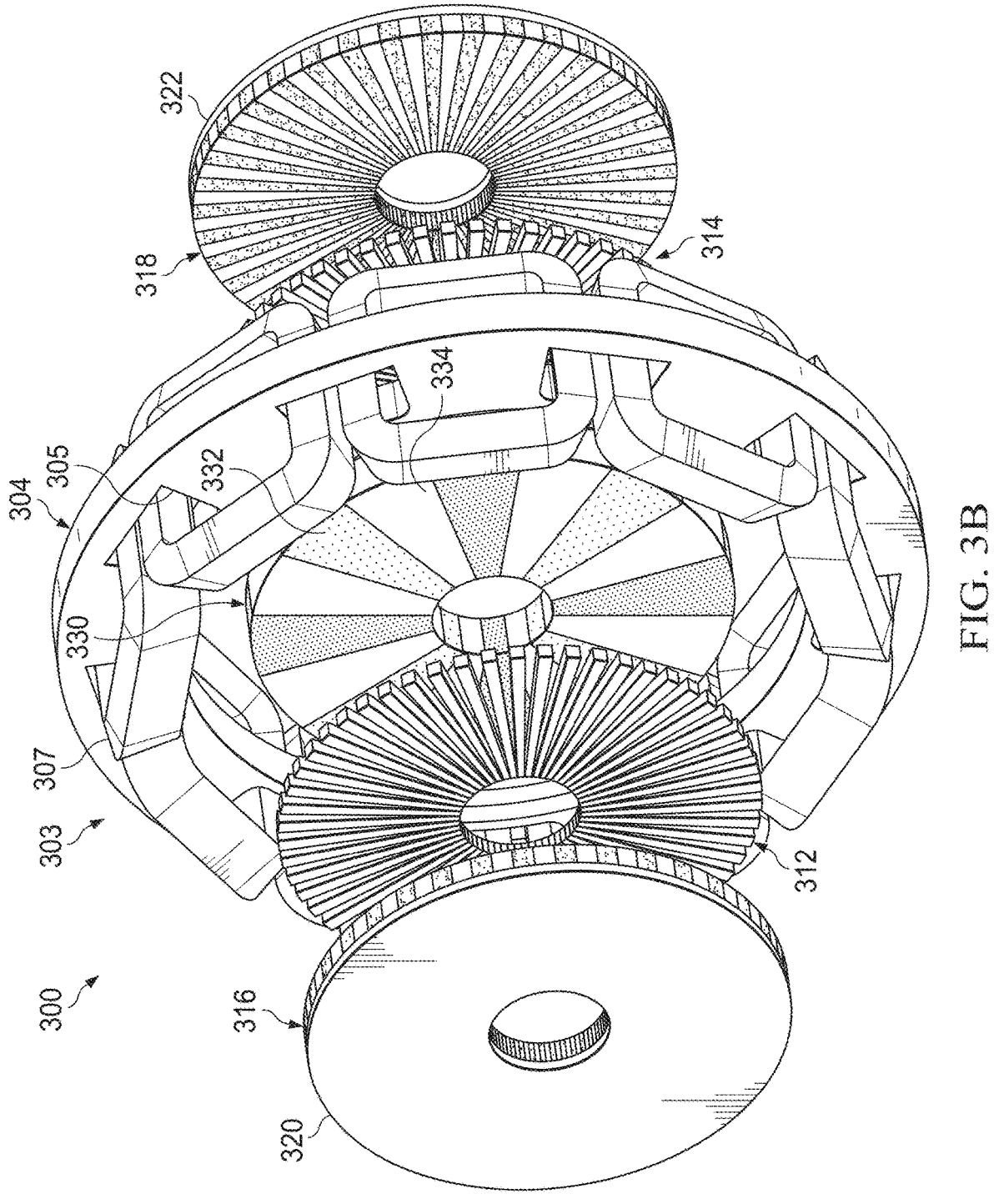
FIG. 3B illustrates an alternative configuration of the dual-rotor axial flux magnetic gear with integrated radial flux electric machine system of FIG. 3A, according to aspects of the disclosure.

FIG. 3B illustrates an alternative design of system 300 having a motor 303. Motor 303 uses a flux focusing arrangement to create both axial and radial flux and includes radial outer stator 304 and inner rotor 330. Stator 304 is unchanged from FIG. 3A and includes the plurality of openings 305 and windings 307. In the aspect of FIG. 3B, rotor 330 includes magnets 332 and ferromagnetic bodies 334 (similar to rotor 206 in FIG. 2A). Magnets 332 of rotor 330 may be magnetized tangentially, with ferromagnetic bodies 334 positioned between to focus the magnetic flux axially. Modulator rotors 312, 314, outer rotors 316, 318, and back irons 320, 322 are unchanged from FIG. 3A. Similar to the design of FIG. 3A, electric current can be supplied to windings 307 to impart rotation on rotor 330. Rotation of rotor 330 in turn causes rotation of outer rotors 316 and 318, but at a different speed than the speed of rotor 306. The speed of the rotating components is reduced relative to the speed of rotor 306 due to the high-pole count configuration of outer rotors 316, 318 and modulator rotors 312, 314. The speed reduction may be tuned by altering the number of magnetic poles of outer rotors 316, 318 and/or the number of soft magnetic pole pieces of modulator rotors 312, 314. Similar to the discussions relative to FIGS. 1 and 2A-2B, shafts may be coupled to one or more of outer rotors 316, 318 and modulator rotors 312, 314.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially", "approximately", "generally", and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a", "an", and other singular terms are intended to include the plural forms thereof unless specifically excluded.

Conditional language used herein, such as, among others, "can", "might", "may", "e.g.", and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A magnetic gear system comprising:
a motor comprising:
    a stator; and
    a pair rotors disposed on either side of the stator, each rotor of the pair of rotors comprising a plurality of magnets that have been magnetized tangentially to focus magnetic flux axially;
a pair of modulator rotors disposed on either side of the motor; and
a pair of outer rotors disposed on opposite sides of the pair of modulator rotors,
wherein the outer rotors have more poles than the pair of rotors of the motor.

2. The magnetic gear system of claim 1, wherein:
one of a modulator rotor of the pair of modulator rotors or an outer rotor of the pair of outer rotors is configured to connect to a first output shaft; and
the other modulator rotor of the pair of modulator rotors or the other outer rotor of the pair of outer rotors is configured to connect to a second output shaft.

3. The magnetic gear system of claim 2, wherein:
the outer rotor is configured to connect to the first output shaft on a first side of the magnetic gear system and the modulator rotor is configured to connect to the second output shaft on a second side of the magnetic gear system; and
the outer rotor and the modulator rotor are configured to rotate in opposite directions.

4. The magnetic gear system of claim 3, wherein the stator is disposed around the rotor.

5. The magnetic gear system of claim 4, wherein the rotor is a flux focusing rotor.

6. A magnetic gear system comprising:
a motor comprising a pair of rotors, each rotor of the pair of rotors comprising a plurality of magnets that have been magnetized tangentially to focus magnetic flux axially:

a pair of modulator rotors disposed on either side of the motor; and a pair of outer rotors disposed on opposite sides of the pair of modulator rotors.

7. The magnetic gear system of claim 6, wherein:

one of a modulator rotor of the pair of modulator rotors or an outer rotor of the pair of outer rotors is configured to connect to a first output shaft; and the other modulator rotor of the pair of modulator rotors or the other outer rotor of the pair of outer rotors is configured to connect to a second output shaft.

8. The magnetic gear system of claim 7, wherein:

the outer rotor is configured to connect to the first output shaft on a first side of the magnetic gear system and the modulator rotor is configured to connect to the second output shaft on a second side of the magnetic gear system; and the outer rotor and the modulator rotor are configured to rotate in opposite directions.

9. The magnetic gear system of claim 7, wherein:

the outer rotor is configured to connect to the first output shaft on a first side of the magnetic gear system and the modulator rotor is configured to connect to the second output shaft on a second side of the magnetic gear system; and the outer rotor and the modulator rotor are configured to rotate in the same direction.

10. The magnetic gear system of claim 6, wherein the motor comprises:

a stator comprising a plurality of windings;

an inner rotor concentrically disposed within the stator, the inner rotor comprising a plurality of magnets secured within a support ring; and a plurality of axial flux magnets secured to the support ring.

11. The magnetic gear system of claim 6, wherein the motor comprises:

a stator comprising a plurality of windings; and an inner rotor concentrically disposed within the stator, the inner rotor comprising a plurality of magnets secured between a plurality of ferromagnetic bodies that are configured to focus magnetic flux axially.

12. The magnetic gear system of claim 1, further comprising ferromagnetic bodies disposed between each magnet of the plurality of magnets.

* * * * *